US012764190B2

(12) United States Patent
Hoetger et al.

(10) Patent No.: US 12,764,190 B2
(45) Date of Patent: Oct. 13, 2026

(54) METHOD AND SYSTEM FOR TRANSFORMING RECORDED COMMUNICATION DATA

(71) Applicant: dSPACE GmbH, Paderborn (DE)

(72) Inventors: Martin Hoetger, Paderborn (DE); Heiko Kalte, Paderborn (DE); Remigiusz Seiler, Paderborn (DE)

(73) Assignee: dSpace GmbH, Paderborn (DE)

( * ) Notice: Subject to any disclaimer, the term of this patent is extended or adjusted under 35 U.S.C. 154(b) by 320 days.

(21) Appl. No.: 18/434,055

(22) Filed: Feb. 6, 2024

(65) Prior Publication Data

US 2024/0267429 A1 Aug. 8, 2024

(30) Foreign Application Priority Data

Feb. 6, 2023 (DE) ..................... 10 2023 102 806.5

(51) Int. Cl.
*H04L 67/12* (2022.01)
*G07C 5/00* (2006.01)
(Continued)

(52) U.S. Cl.
CPC .............. *H04L 67/12* (2013.01); *G07C 5/008* (2013.01); *H04L 12/40032* (2013.01);
(Continued)

(58) Field of Classification Search
CPC ... H04L 67/12; H04L 12/40032; H04L 43/04; H04L 2012/40215; H04L 2012/40234; H04L 2012/40273; H04L 43/50; H04L 41/0803; H04L 41/22; H04L 43/08; H04L 43/55; G07C 5/008
See application file for complete search history.

(56) References Cited

U.S. PATENT DOCUMENTS

| | | | | |
|---|---|---|---|---|
| 12,487,899 | B2 * | 12/2025 | Teplinsky | G06F 11/263 |
| 12,524,259 | B2 * | 1/2026 | Sielhorst | G06F 9/45558 |

(Continued)

FOREIGN PATENT DOCUMENTS

| | | | |
|---|---|---|---|
| CN | 112104524 | A | 12/2020 |
| DE | 102019120519 | A1 | 2/2021 |

(Continued)

OTHER PUBLICATIONS

Dspace; "Data Replay Validating ADAS/AD components using recorded data"; Feb. 5, 2024.

(Continued)

*Primary Examiner* — Jay P Patel
(74) *Attorney, Agent, or Firm* — Muncy, Geissler, Olds & Lowe, P.C.

(57) ABSTRACT

A method for transforming recorded communication data by means of a first program, wherein the communication data is given by messages from a network or bus communication, wherein the recorded communication is carried out on the basis of a first communication matrix, wherein the recorded communication data is provided to be sent by means of a test system to an ECU under test, wherein the test system is connected via a first communication link to the ECU under test, wherein the ECU under test is configured based on a second communication matrix.

15 Claims, 6 Drawing Sheets

(51) Int. Cl.
*H04L 12/40* (2006.01)
*H04L 43/04* (2022.01)

(52) U.S. Cl.
CPC .... *H04L 43/04* (2013.01); *H04L 2012/40215* (2013.01); *H04L 2012/40234* (2013.01); *H04L 2012/40273* (2013.01)

(56) References Cited

U.S. PATENT DOCUMENTS

| | | | | |
|---|---|---|---|---|
| 12,537,716 | B2 * | 1/2026 | Chen | H04L 12/437 |
| 2012/0101791 | A1 * | 4/2012 | Komatsu | G05B 17/02 703/6 |
| 2013/0151220 | A1 * | 6/2013 | Matsumura | G06F 9/4881 703/7 |
| 2019/0325672 | A1 * | 10/2019 | Stefan | G06F 30/20 |
| 2020/0244558 | A1 * | 7/2020 | Palander | H04L 43/0852 |
| 2021/0373545 | A1 | 12/2021 | Mueller | |
| 2022/0043411 | A1 | 2/2022 | Gehrke et al. | |
| 2022/0058113 | A1 * | 2/2022 | Mizoguchi | G06F 11/3698 |
| 2022/0058318 | A1 * | 2/2022 | Aslandere | G06N 3/092 |
| 2022/0108172 | A1 * | 4/2022 | Aslandere | G06N 3/08 |
| 2022/0245308 | A1 * | 8/2022 | Aslandere | G06F 30/27 |
| 2022/0274607 | A1 * | 9/2022 | Aslandere | G06N 3/08 |
| 2022/0374428 | A1 * | 11/2022 | Nassar | G06F 16/284 |
| 2023/0161931 | A1 * | 5/2023 | Kwak | G06F 30/20 703/2 |
| 2023/0195500 | A1 * | 6/2023 | Sielhorst | G06F 9/45558 718/1 |
| 2023/0199168 | A1 * | 6/2023 | Sauer | H04N 17/02 348/181 |
| 2023/0202492 | A1 * | 6/2023 | Bomert | G06F 11/2289 701/23 |
| 2023/0353544 | A1 | 11/2023 | Mueller | |
| 2023/0396464 | A1 * | 12/2023 | Chen | H04L 12/437 |
| 2024/0160542 | A1 * | 5/2024 | Teplinsky | G06F 30/20 |
| 2024/0241491 | A1 * | 7/2024 | Muehlenhoff | H04W 4/40 |

FOREIGN PATENT DOCUMENTS

| | | | |
|---|---|---|---|
| DE | 102020120840 | A1 | 2/2022 |
| DE | 102021125399 | A1 | 3/2023 |
| WO | WO2020165067 | A1 | 8/2020 |
| WO | WO2022013335 | A1 | 1/2022 |

OTHER PUBLICATIONS

Dspace; “FAW Hongqi: Is it okay Ph(V)il?”; Feb. 5, 2024.
DSpace GmbH; “Bus Manager—Configuration for LIN, CAN, and CAN FD bus simulation”; May 2021.
DSpace; Bus Manager (Stand Alone) Implementation Guide for Bus Manager 6.8 Release 2021-B—Nov. 2021.
Bautista et al; “Vegetation cover change detection in Chamela-Cuixamala, Mexico” Remote Sensing for Agriculture, Ecosystems and Hydrology, 2009, XP040502038.

* cited by examiner

METHOD AND SYSTEM FOR TRANSFORMING RECORDED COMMUNICATION DATA

This nonprovisional application claims priority under 35 U.S.C. § 119(a) to German Patent Application No. 10 2023 102 806.5, which was filed in Germany on Feb. 6, 2023, and which is herein incorporated by reference.

BACKGROUND OF THE INVENTION

Field of the Invention

The invention relates to a test system and a method for transforming recorded communication data, wherein the communication data is given by messages from a network or bus communication, wherein the recorded communication is carried out on the basis of a first communication matrix, wherein the recorded communication data is provided to be sent by means of a test system to an electronic control unit (ECU) under test, wherein the test system is connected via a first communication link (e.g., CAN, LIN or Ethernet connection) to the ECU under test, wherein the ECU under test is configured based on a second communication matrix, in particular a second version of the communication matrix.

Description of the Background Art

The arrival of Advanced Driver Assistance Systems (ADAS) and Autonomous Driving (AD) functions in today's vehicles, for which the vehicle ECUs require a wealth of sensor data to detect the traffic situation, which are collected, for example, with environmental sensors installed in the vehicle, always requires new methods of validating these ECUs and entire systems formed of several networked ECUs. One way to address the high (test) complexity is to present a computer-generated virtual environment to the sensors as well as the network of ECUs under test (simulated roads, intersections, vehicles, pedestrians, signs, etc., see, "Appendix-1" which is attached hereto and incorporated herein by reference. However, purely virtual validation is usually not sufficient and must be underpinned by actually driven test kilometers. For this purpose, the vehicle is moved in a first stage of development with the appropriate sensors and the various ECUs in real traffic scenarios and the relevant data is recorded with precise time stamps (e.g., with the help of the dSPACE AUTERA system, which can serve both as a data logger and, if necessary, as a playback device for the recorded (logged) data). Relevant data in this context are both the raw sensor data (e.g., camera, lidar, radar) and the communication data of the network communication (e.g., CAN and Ethernet traffic) relevant for an ECU as "device under test" (DuT). This "actually driven" test data is very time-consuming, cost-intensive and virtually not completely reproducible (e.g., due to changed weather conditions). As a result, actually driven data from test kilometers represent a certain investment and value for a company.

The recorded data can be reused in the laboratory, e.g., in a hardware-in-the-loop (HIL) test or a software-in-the-loop (SIL) test, to test new development levels of an ECU or an ECU network without having to put a vehicle on the road again. For this purpose, it must be possible to replay the data streams of sensor data and the communication data from bus and/or network communication in a synchronized manner. Such a procedure is called a data replay test (https://www.d-space.com/en/pub/home/applicationfields/foo/data_replay.cfm?gclid=EAlalQobChMIlty JkObpwIV1QiLCh0Ghwg4EAAYASAAEgKmMPD_BwE), which is attached hereto as "Appendix-2", and which is incorporated herein by reference. If necessary, time stamps, counter values and/or security codes must be adjusted when the recorded data is sent to the ECU under test, as described in WO2020/165067A1 (which corresponds to US 2021/0373545, which is incorporated herein by reference) or WO2022/013335A1 (which corresponds to US 2023/0353544, which is incorporated herein by reference).

The ECU or ECU system must already have a certain degree of maturity at the time the test data is run in, but it is usually still subject to changes due to further development and troubleshooting. These changes must be taken into account when playing the logged data. Typical changes are changes in the so-called communication matrix. The communication matrix defines all communication elements such as protocol data units (PDUs), frames, headers and user data with signals contained therein, etc. In other words, it determines the structure of the messages, but also the topology of the network participants and, if necessary, security codes. Very often, the elements in the communication matrix are defined according to the AUTOSAR standard.

A typical problem in this context is, for example, that in a new stage of development with a new, second communication matrix, the user data of a certain CAN message is extended by an additional signal as compared to the specification of this CAN message in the first version of the communication matrix, which was still current at the time of data acquisition. This, in turn, means that the ECU under test configured with the second communication matrix calculates with this additional signal in the specified CAN message, which signal, however, was not yet specified for this message at the time of data acquisition and is therefore not present in the recorded communication data. The recorded communication data can therefore no longer be used for the test of the ECU without changes. This means that a new test drive would have to be carried out for a new data acquisition or a virtual test drive.

SUMMARY OF THE INVENTION

It is therefore an object of the invention is to provide a method and a test system that further advances the state of the art.

The object is achieved by a method executed by means of a first program, wherein the method is preferably implemented on the test system or a suitable computer and includes the following method steps: Reading of the first and second communication matrix; Comparing the elements of the communication matrices by assigning identical or corresponding elements and (ii) categorizing changes in the elements of the second communication matrix as compared to the elements of the first communication matrix; Determining the data to be transformed, wherein the data to be transformed is given by those communication data that can be assigned to an element of the first communication matrix that corresponds to an element of the second communication matrix, wherein the element of the second communication matrix shows changes—especially categorized—as compared to the corresponding element of the first communication matrix; Processing of the communication data by transforming the specific data in accordance with the specified rules on the categorized changes, ii) discarding the recorded communication data that can be assigned to an element of the first communication matrix for which no identical or corresponding element exists in the second communication matrix; and Sending the recorded data that cannot be discarded or transformed and sending the transformed data to the ECU under test or saving the data to be sent in a file.

It is irrelevant in which order the first and second communication matrix are read. For each element of the second communication matrix—which is the current communication matrix for the ECU under test—the comparison checks whether an identical element is present in the first communication matrix on the basis of which the communication data was recorded. If this is the case, the corresponding recorded messages can be played back unchanged during a replay test of the ECU under test, subject to the above adjustments to timestamps, counter values and/or security codes. The presence of an identical element in the first communication matrix is noted by the first program, e.g., by means of a link to a database or to a memory. This assigns the elements to each other. An alternative way of assigning would be, for example, to create a table to be stored in the test system, with a column for each element of each communication matrix, with identical elements of the communication matrices listed in the same row. Such a table could also easily be extended to other communication matrices from later stages of development.

Corresponding elements of the two communication matrices can also be assigned to each other.

Corresponding elements are those elements in which the element of the second communication matrix is essentially the same as an element of the first communication matrix, so that it can be seen that the element of the first communication matrix is identical to the element of the second communication matrix except for one categorized change or possibly several categorized changes.

Categories of changes are already specified in the first program or can be specified by the user, e.g., via a graphical user interface (GUI).

The recorded communication data can be used to determine the data that can be assigned to an element of the first communication matrix to which a corresponding element of the second communication matrix has been assigned. Such a determination can be made, for example, as part of a HIL or SIL test. For such tests, there are various tools that offer the possibility of data inspection on the bus channel or the network connection through which the data reaches the test system, see also the attached Appendix-3, which is incorporated herein by reference. For this purpose, a program is installed on the test system for analyzing the data transmitted on a bus or network connection. For example, this program can be called up and executed by the first program and determine whether a message belongs to a corresponding element of the first communication matrix. However, such a program can also be implemented on an ordinary PC and used for pre-processing of the data.

If an element of the first communication matrix is assigned to a corresponding element of the second communication matrix, the corresponding data of the message is determined as data to be transformed. It should be noted that there can also be several corresponding elements of the first communication matrix to one element of the second communication matrix, e.g., if the signals from two PDUs described in the first communication matrix are combined into a single PDU in the second communication matrix. The reverse case should also be noted.

The data specified are transformed in such a way that they can then be assigned to the corresponding element from the second communication matrix. The transformation is carried out by means of transformation rules for the respective categorized changes specified in the first program or by the user via a GUI or a file to be read.

Recorded communication data for which no reference to an element of the second, current communication matrix can be established will be discarded in step d)ii), i.e., not taken into account for the further procedure, as they are not needed.

All communication data that match the definitions of the second communication matrix are then sent to the ECU under test in a replay test or initially stored in a file. The file can then be used as a data source in a later replay test of the ECU under test.

An advantage of the method according to the invention is that recorded communication data can still be used even if the underlying communication matrix is changed or modified.

Further, corresponding messages can be simulated for the elements of the second communication matrix for which no corresponding element exists in the first communication matrix, by means of residual bus simulation.

The simulated data is sent to the ECU under test or stored in the file.

In HIL and SIL tests, residual bus simulation is the term used to describe simulation programs which, when testing an ECU that is to be used in a network of ECUs, simulate those messages that are expected from the ECU under test, wherein however the ECUs that should send the expected messages are not yet available (neither real nor virtual). According to the invention, such a residual bus simulation can be used for messages to elements of the second communication matrix that have been newly added since the first communication matrix.

The residual bus simulation of the messages to the elements of the second communication matrix that have no equivalent among the elements of the first communication matrix can be performed during the HIL or SIL test of the ECU under test. In this case, the method according to the invention can also be regarded as a test method. Alternatively, these messages are generated before the test and stored in a file for later testing, along with the transformed data and the non-discarded data, which can be reused without further processing.

The residual bus simulation thus offers the possibility of supplementing the recorded communication data. These additional messages can also be generated before the actual test is performed. This reduces the amount of simulation required during the test.

The implementation the transformation of the communication data, can also be carried out at least partially by means of the simulation program for the residual bus simulation by adapting or extending it appropriately.

An element of a communication matrix by which the definition or specification of a PDU of a message (e.g., an I-PDU defined according to AUTOSAR for the user data of a message with the signals contained in the user data) or a frame (e.g., a CAN frame) of a message is provided.

PDUs are defined in a communication matrix, for example, by specifying IDs, their communication path, the signals contained in them, and—in the case of service-based communication—by specifying the methods to be used. The communication path here refers to information on transmitting and receiving ECU(s) as well as the communication link used (e.g., the port and/or communication technology such as CAN, LIN, etc.). Typically, a PDU is also given a pathname that describes the communication path.

A first higher-level change category is provided for a change to the PDU or a change to the frame, which does not affect the content of the PDU or the frame.

This first change category can have subcategories.

For example, a subcategory may include the elimination of entire PDUs or frames, while another subcategory refers to the changes that concern the addition of a new PDU or frame.

Another subcategory refers to the changes that have are given by changing a parameter for the PDU or the frame, e.g., if the port on which the PDU or frame is to be received changes. Preferably, a second higher-level category of change is given by a change in the user data and/or signals in the user data of the PDU or frame, wherein subcategories specify whether, for example, a signal has been added to a PDU as compared to the first communication matrix or a signal is now omitted. Changing the signal coding is also a possible change category.

The advantage of categorizing the changes is that different instructions for action can be stored in the first program for the different categories or can be specified for the first program, e.g., in a file to be read or via a user interface. According to these instructions, the recorded communication data must then be transformed in such a way that it conforms to the second communication matrix.

This is because if an element in the second communication matrix shows changes as compared to a corresponding element in the first communication matrix, these changes must also be taken into account when sending the recorded data to the ECU under test configured with the second communication matrix. According to the invention, the communication data are transformed accordingly so that they are recognized by the ECU under test as belonging to the corresponding element of the second communication matrix.

To this end, it is necessary to identify the corresponding elements of the communication matrices.

In an example, it is done by comparing the names and/or path names of the elements of the first communication matrix with the names and/or path names of the elements of the second communication matrix and/or by comparing the identification numbers (IDs) of the respective elements.

If, for example, the second communication matrix is given by a later version of the first communication matrix, it may be that one or more changes have been made to a message in the course of the further development of the ECU network, such as a signal being added to the PDU of a message. If the path name of this element (of the PDU) specified in the communication matrices has remained the same, but there is a change in the form of the added signal, then the first program algorithmically recognizes that these elements of the first and second communication matrix with identical memory paths are corresponding elements.

So, for example, for a first element of the second communication matrix, the path name is considered, and then the elements of the first communication matrix are searched for an element with the same path name. If this is found, it is checked whether the specification of the elements in both communication matrices is the same. If there are any changes to the specification, these must be taken into account in the playback of the recorded data and appropriate transformations must be made.

If it is known that unique IDs exist for the entire communication matrix or perhaps only in relation to certain clusters of networks or bus systems described therein, these IDs can also be used for comparison and identification of corresponding elements.

This approach is particularly advantageous if the communication matrices are available in one of the common exchange formats (AR, DBC, LDF, FIBEX, . . . ), which usually provide ID-based systems for the unambiguous identification of the elements.

The recorded communication data to be transformed are read out of a data stream, in particular one after the other, and can be carried out during the ongoing test of the ECU under test. This example does not require any pre-processing of the recorded data. They can be sent directly to the test system from their storage location (e.g., on a playback device such as a suitable PC or, if necessary, an AUTERA system from dSPACE GmbH).

In particular, they are made available directly to the test system for processing the communication data via a second communication link. The second communication link can be provided by a physical communication link, such as an Ethernet connection from a playback device to the test system or within the test system. Alternatively, the second communication link can be provided by a virtual communication link, i.e., a virtual data bus within the test system.

Preferably, the transformation of the data, the residual bus simulation and the manipulation of the messages is executed on the test system by means of at least a first computing unit and an associated storage unit. A preferred computing unit in this case is a processing unit.

In an example, the steps of reading, comparing, determining, processing can be performed before the execution of the test and the recorded and transformed data belonging to elements of the first communication matrix that have an identical or a corresponding element are stored or deposited in a file (or other convenient storage location, storage medium, storage format) and read out from the file or similar during a test of the ECU under test. In the following, in this context, the generalized term file is used.

This means that the data is already processed before the test is carried out, i.e., before the replay test, according to the second communication matrix.

This processing can also be carried out on another computer, such as a suitable PC equipped with appropriate parts of the first program, but which is not a permanent and mandatory part of the test system. The file is then made available to the test system for the test execution, e.g., loaded onto the test system, or the file with the pre-processed data is stored on a playback device, where the data is then read out to the test system during the test of the ECU under test and transmitted via the second communication link to the test system.

The advantage of this example is that the pre-processing reduces the computational effort required to perform the test.

User data of messages can be acquired from the communication data and the signals in the user data are compared with the specifications for signals by the elements of the second communication matrix. The examination is preferably carried out by the test system by means of the above-mentioned data inspection, unless the communication data is read from a file, then the examination can also be carried out, for example, by means of an appropriate further program on the mentioned suitable PC.

The examination of the messages and the user data content has the advantage that any changes that affect the content of the communication data are identified and categorized, and that the recorded communication data can be adapted to the second communication matrix also in this respect.

The test system can have a gateway with a configurable filter function, wherein messages sent via the second communication link to the test system and cannot be assigned to any element of the second communication matrix are filtered by means of the gateway.

For example, messages with an ID that is contained in the first communication matrix, but for which there is no equivalent in the second communication matrix, can be quickly and efficiently filtered out from the data stream of the recorded data.

Values in the communication data are transformed and/or manipulated by means of the test system directly before they are passed on to the ECU under test via the first communication link.

For example, if a temperature signal is specified in the second communication matrix in Celsius, while in the first communication matrix it was specified in Fahrenheit, according to the invention, a corresponding value transformation in the communication data is carried out.

Manipulation is carried out when a specification (e.g., user input via a GUI) for an arbitrary change or addition of a value is present, or if backup data need to be set or corrected based on new timestamps. One possibility is to use a manipulation program for this purpose, see the attached Appendix-4, which is incorporated herein by reference.

However, a transformation or manipulation function can also be integrated into a program for residual bus simulation.

Such a transformation or manipulation offers further possibilities to adapt the recorded communication data to the second communication matrix or to change it for test purposes in order to test the error detection of the device under test.

The second communication matrix can be given by a second version of the first communication matrix. In this case, as a rule the identification of corresponding elements of the communication matrices is facilitated, in particular by corresponding user input of the changes made.

At least the part of the first program for transforming the recorded communication data can be generated by a second program for generating program code and based on the comparison of the communication matrices and user input, is generated in an optimized form.

This has the advantage that an optimized first program code can be generated which, based on the comparison of the communication matrices, only contains the specific change categories and transformation instructions required. This increases the efficiency of the first program and allows for more accurate and efficient specifications on the transformation of the communication data. It is particularly advantageous when multiple sets of communication data are recorded from several test drives based on the first communication matrix and need to be transformed in accordance with the same second communication matrix.

The object is also achieved by a test system which is set up to carry out the method according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
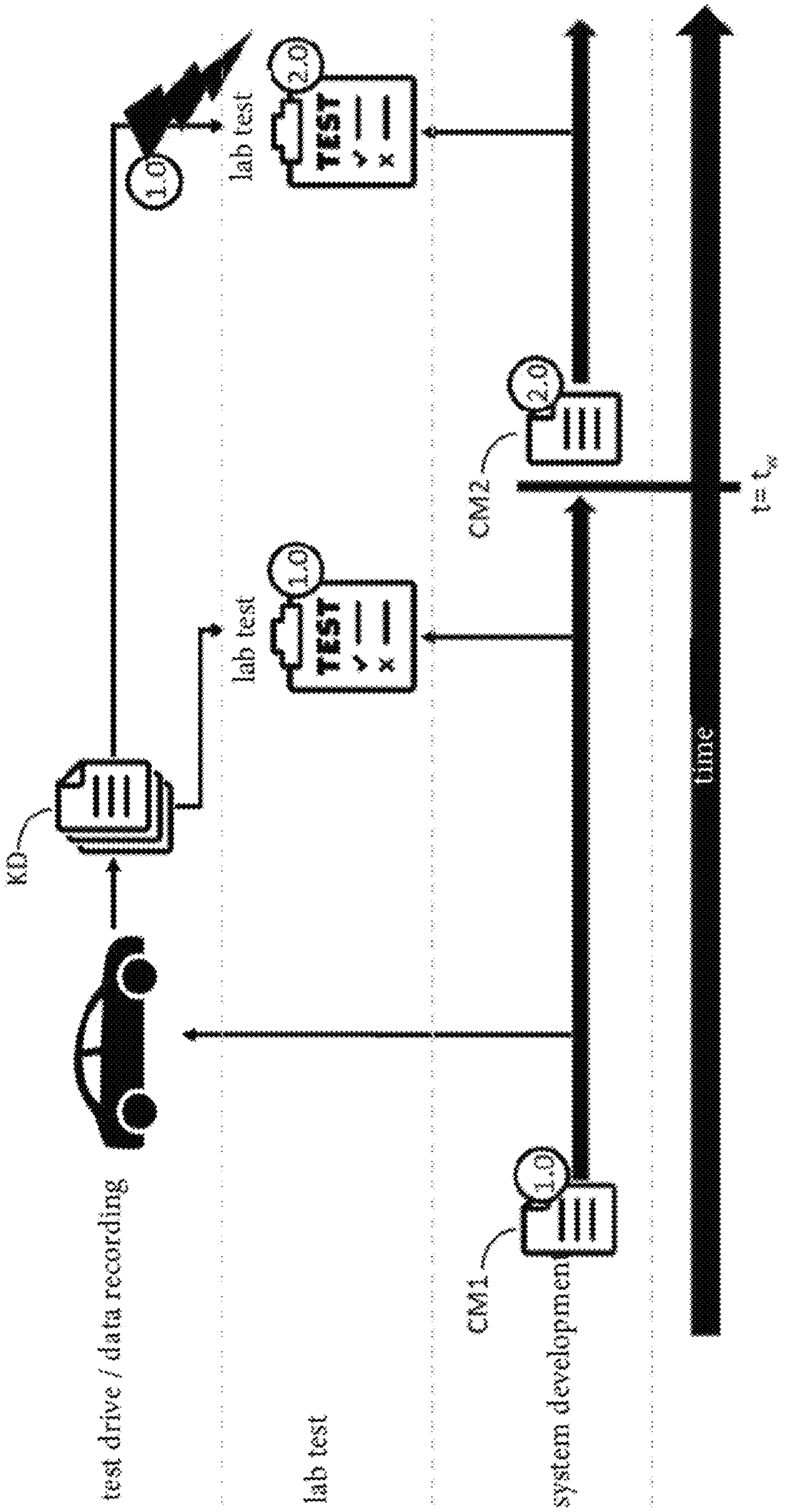
FIG. 1 is a schematic view of the test situation at different stages of development.

The illustration in FIG. 1 shows a schematic view of test situations at different stages of development of a vehicle. The vehicle is symbolized by a car. System development progresses over time. The ECUs and their communication relationships—e.g., which messages with which ID and which signals are sent from a first ECU to a second ECU via which communication link—are always described in a communication matrix on the basis of which the communication system in the vehicle is configured. With a first stage of development 1.0, for which a first communication matrix CM1 is up-to-date, a test drive with data acquisition is carried out in order to be able to carry out communication data KD for a laboratory test Lab Test, especially in the form of a HIL or a SIL test. From a later point in time t=tw, a further stage of development 2.0 is reached and the first communication matrix CM1 is updated by a second communication matrix CM2. Due to changes in the elements of the second communication matrix CM2 as compared to the elements of the first communication matrix CM1, the recorded communication data KD can no longer be used for a laboratory test Lab Test, because the messages contained therein are no longer recognized as the messages defined in the current communication matrix and accepted by the ECUs in the event of changes.

Figure 2A:
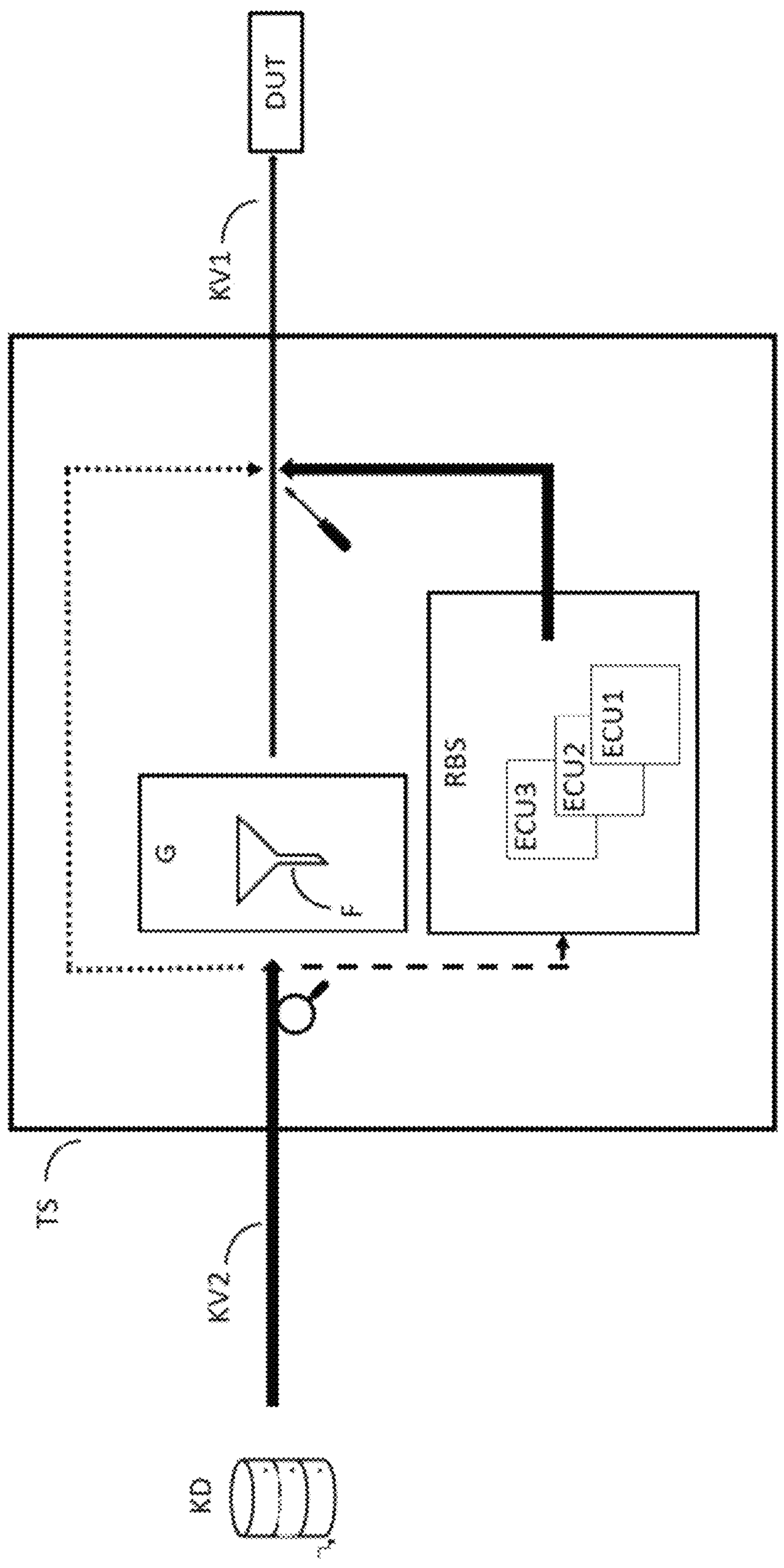
FIG. 2*a* is a schematic representation of a HIL test according to the invention using recorded communication data.

FIG. 2*a* schematically shows a test system TS for a HIL test, which is connected to an ECU under test DUT via a first communication link KV1. The recorded communication data KD is fed to the test system TS by a playback device not explicitly shown here in the form of messages via a second communication link KV2. The communication links KV1, KV2 can be, for example, bus connections such as CAN or LIN or network connections such as (automotive) Ethernet connections. The test system TS has a real-time computer system for a HIL test, especially for automotive ECUs, and is also set up to examine the incoming messages, i.e., to carry out an inspection of the communication data KD. This is indicated by the magnifying glass symbol in the figure. During this inspection, the headers and user data of the messages can be read or checked (e.g., for the correct length). The communication data KD is assigned to elements of the first communication matrix CM1 or directly to elements of the second communication matrix CM2 by means of a non-shown computing unit of the test system TS and it is determined whether a transformation of the data is necessary. In the embodiment shown here, the messages are routed to a gateway G, which has a filter function F, so that messages that can be assigned to an element of the first communication matrix CM1, for which no identical or corresponding element exists in the second communication matrix CM2, are sorted out directly.

For messages whose contents or frames require a transformation to adapt to the elements of the second communication matrix CM2, corresponding algorithms are applied in the computing unit of the test system TS. For this purpose, the user data with the signals contained therein may be unpacked, processed accordingly and then repackaged in order to send them via the first communication link KV1 to the ECU under test DUT. The separate processing of the pure user data or signals from the messages is indicated by the dotted arrow.

If the examination of the communication data KD shows that certain messages are missing in whole or in part (e.g., missing signals in user data), corresponding commands are sent to a unit in the test system that is available for the residual bus simulation RBS. If necessary, user data and signals (indicated by the dashed arrow) are also transferred to the residual bus simulation RBS. If, for example, two PDUs from the first communication matrix CM1 have been omitted from the second communication matrix CM2, but their signals are now combined in a third "new" PDU in the second communication matrix CM2, the relevant contents of the two PDUs from the first communication matrix CM1 are determined by the data inspection in front of the gateway G and transferred as input to the residual bus simulation RBS in order to generate the new third PDU.

This unit RBS can be implemented on the mentioned computing unit or another calculation unit. Preferably, the residual bus simulation RBS outputs complete, packaged messages that can be passed to the first communication link KV1 without further processing. These simulated messages can simulate to the ECU under test DUT messages from other ECUs ECU1, ECU2 and ECU3 that are not available but are required according to the second CM2 communication matrix.

In FIG. 2*a*, a symbolic screwdriver also indicates that the test system TS is also set up to manipulate messages before sending them via the KV1 communication link to the ECU under test DUT. Manipulation here means that values from the messages are changed in a targeted manner, especially for testing purposes. For example, a signal value can be arbitrarily changed according to a user's specifications, or time-dependent encryption, such as the security codes mentioned above, can be adjusted according to a current counter value. However, parameters of the message can also be changed to test whether the ECU DUT reacts appropriately to errors.

Figure 2B:
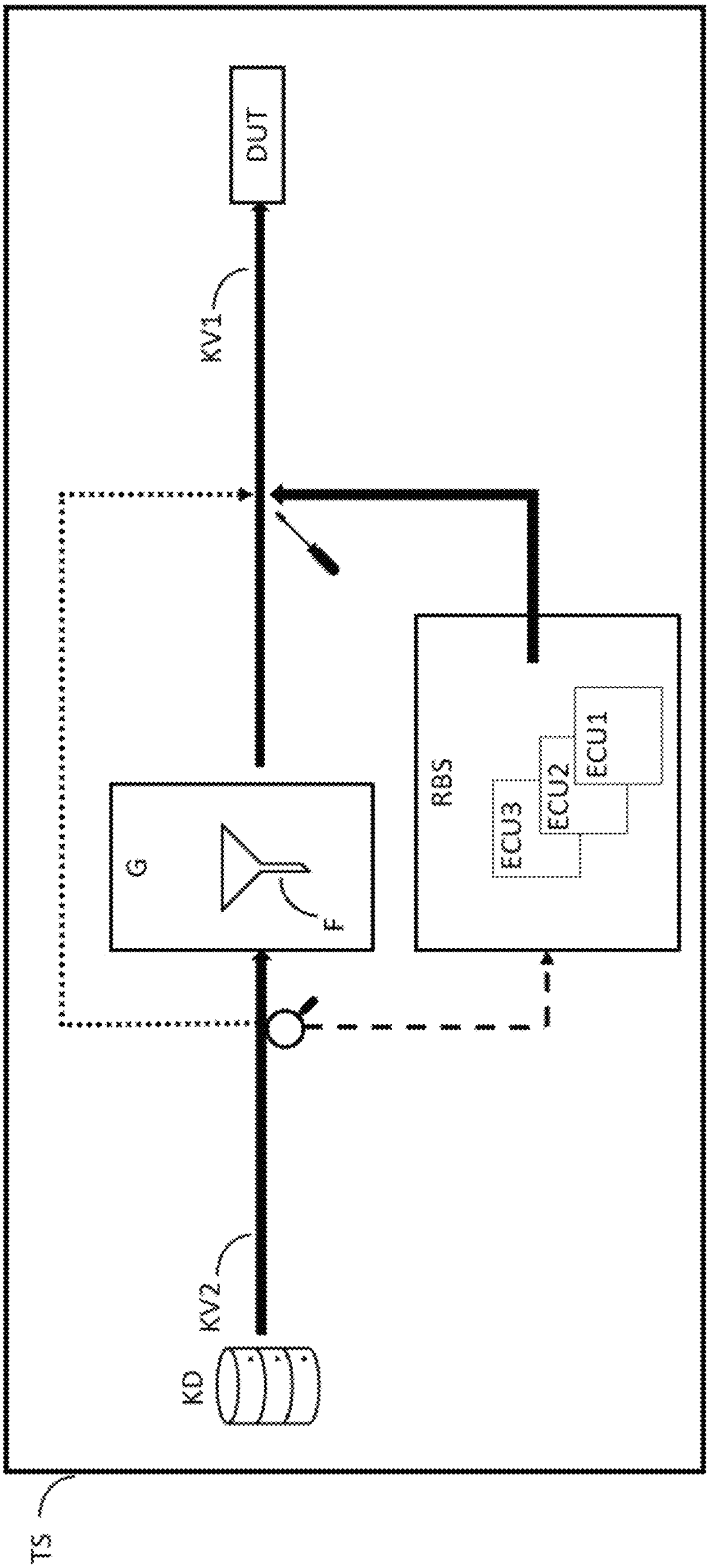
FIG. 2*b* is a schematic representation of a SIL test according to the invention using recorded communication data.

Accordingly, FIG. 2*b* shows a test system TS for a SIL test for the execution of the method according to the invention. In contrast to the HIL test, no real-time computer system is required here. The ECU under test DUT is available in a software version and can therefore be connected to the simulation via a virtual communication link KV1. In FIG. 2*b*, for example, the test system TS is given by a suitable PC on which the recorded communication data KD are also stored. These are imported here via a virtual second communication link KV2. The investigation, filtering, transformation of the communication data, the residual bus simulation and the manipulation of the messages and communication data KD proceeds in principle in the same way as in the case of the HIL test described in FIG. 2*a*. The same signs also have the same functions, as described there.

Figure 3:
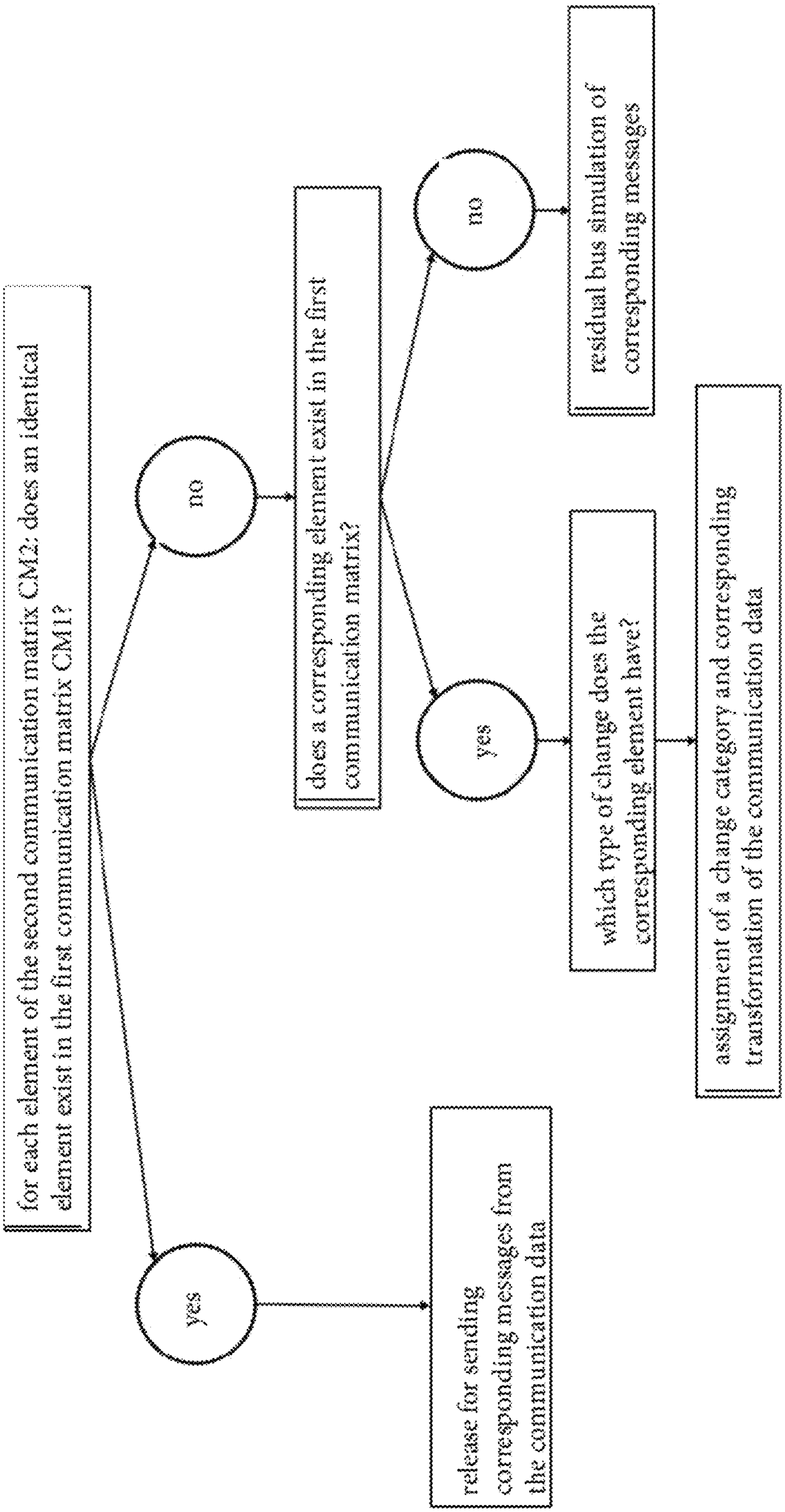
FIG. 3 is a flowchart describing the method step (b) according to the invention.

FIG. 3 now shows a flow diagram of the sequence of method step b) according to the invention. For each element of the second communication matrix CM2, it is checked whether an identical element exists in the first communication matrix CM1. If this is the case, the filter F of the test system TS is set in such a way that all messages that can be assigned to these elements of the first communication matrix CM1 with an identical element in the second communication matrix CM2 are allowed to pass from the gateway G to the ECU under test DUT.

If there is no identical element in the first communication matrix CM1, it is checked whether there is a corresponding element in the first communication matrix CM1. For example, if an element in the first communication matrix CM1 has the same path name, but the content description for the element shows differences, the type of difference or change is searched for in a given list and a corresponding transformation rule is extracted. For all messages that can be assigned to the corresponding element of the first communication matrix CM1, the transformation rule corresponding to the change is stored and executed.

For all elements of the second communication matrix CM2 for which no identical or corresponding element exists in the first communication matrix CM1, a residual bus simulation RBS of corresponding messages is created for the test execution.

Figure 4:
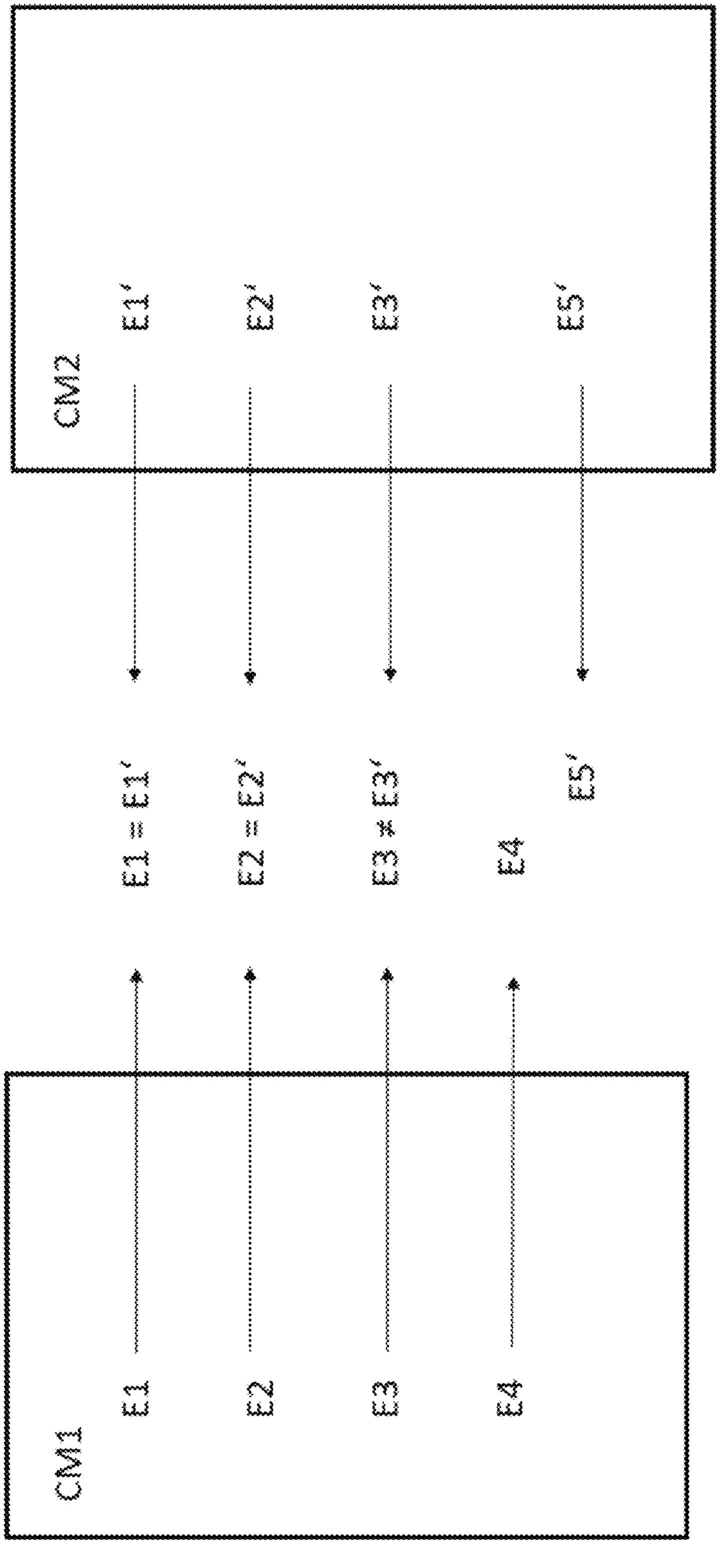
FIG. 4 is a schematic representation of a comparison of elements of a first and a second communication matrix.

The comparison of the elements of the communication matrices CM1, CM2 is also schematically illustrated in FIG. 4. The elements E1', E2', E3', E5' of the second communication matrix CM2 are each contrasted with the elements E1, E2, E3, E4 of the first communication matrix CM1. For the first and second elements E1 and E1' as well as E2 and E2' an identity is established. E3 and E3' are identified here as corresponding elements, e.g., on the basis of the same path names, wherein however the examination of the content definition reveals changes in the element E3' of the second communication matrix CM2 as compared to the element E3 of the first communication matrix CM1. For the element E5' no correspondence is found in the comparison. For element E4, it may be checked whether it could be a corresponding element, but if the system has no specifications for a change from E4 to E5' the system as categorized changes, messages from the communication data KD that can be assigned to the element E4 are to be discarded for the test.

Figure 5:
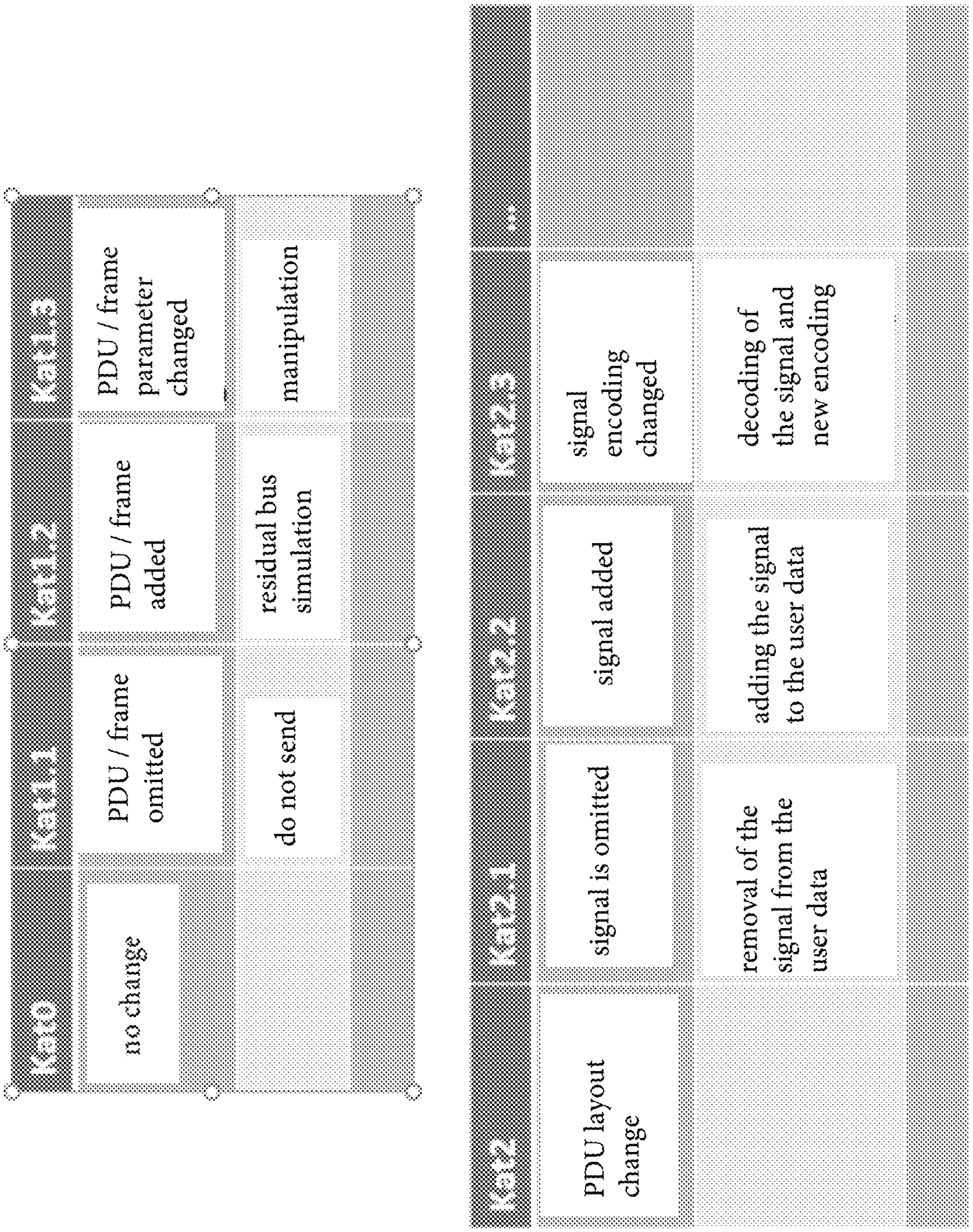
FIG. 5 is tabular overview of a possible categorization of changes to elements of a communication matrix.

FIG. 5 schematically shows an exemplary list of categorized changes and corresponding transformation instructions.

The category Kat0 is also included here for identical elements that do not require a transformation. Category Kat1 with the subcategories Kat1.1, Kat1.2 and Kat1.3 describes the changes that affect a complete PDU or a frame. In this case, the omission Kat1.1 or the additional occurrence Kat1.2 of a PDU or a frame also represents a change in the elements of the second communication matrix CM2 as compared to the elements of the first communication matrix CM1. In the case of the category Kat1.1, the transformation instruction is "do not send" the corresponding recorded messages, so that these messages are not forwarded to the ECU under test DUT.

The transformation instruction in the case of category the Kat1.2 is "residual bus simulation", so that the residual bus simulation RBS is set up to simulate corresponding messages during the ECU test, as these are not present in the recorded communication data.

The category Kat1.3 describes the case where a parameter of a PDU or a frame has been changed, such as the parameter for the length of the payload. In this case, the transformation instruction is to change this parameter accordingly during the test, e.g., using the manipulation tool, for each message that can be assigned to the corresponding element of the first communication matrix CM1.

The change category Kat2 here concerns layout changes of a PDU, i.e., for example, that specifications for the signals that are transported in the payload of a PDU have changed. FIG. 5 shows the possibilities that a signal has been omitted for category Kat2.1, a signal has been added for category Kat2.2, or the encoding for a signal has changed for category Kat2.3. Other categories are conceivable, as indicated by the three dots in the following column. It is also possible that several categories of changes have to be observed for a pair of corresponding elements E3, E3'. For example, changing the payload length parameter according to category Kat1.3 may also involve a layout change if another signal is added to a longer payload, as described in category Kat2.2.

It is not necessary for the invention that all changes are necessarily recorded and categorized. The automatic adaptation of recorded communication data KD by means of certain predefined changes alone can be a great advantage and, if necessary, make it possible for the recorded data to be used for later development stages.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for transforming recorded communication data via a first program, the communication data being provided by messages from a network or bus communication, the recorded communication being carried out on a basis of a first communication matrix, the recorded communication data being provided to be sent via a test system to an ECU under test, the test system being connected via a first communication link to the ECU under test that is configured based on a second communication matrix, the method comprising:

a) reading the first and second communication matrix;

b) comparing elements of the communication matrices by:

i) assigning identical or corresponding elements; and ii) categorizing changes in the elements of the second communication matrix as compared to the elements of the first communication matrix;

c) determining the data to be transformed, wherein the data to be transformed are given by those communication data that are adapted to be assigned to an element of the first communication matrix that corresponds to an element of the second communication matrix, wherein the element of the second communication matrix has categorized changes as compared to the corresponding element of the first communication matrix;

d) processing the communication data by:

i) transforming the determined data according to predefined rules to the categorized changes;

ii) discarding the recorded communication data, which can be assigned to an element of the first communication matrix for which no identical or corresponding element exists in the second communication matrix;

e) sending the recorded data that is not to be discarded or transformed and sending the transformed data to the ECU under test or saving the data to be sent in a file.

2. The method according to claim 1, wherein step (d) of the method comprises a further sub-step:

d) iii) Simulating corresponding messages for the elements of the second communication matrix for which there is no corresponding element in the first communication matrix by means of residual bus simulation, and wherein the simulated data is sent to the ECU under test or saved in the file.

3. The method according to claim 1, wherein an element of a communication matrix is given by the definition of a protocol data unit (PDU) or a frame of a message, and wherein a first category is given for the change with respect to the PDU or the change with respect to the frame, and wherein a second category of the change is given by a change in the user data and/or signals in the user data of the PDU or frame.

4. The method according to claim 1, wherein the identification of the corresponding elements of the communication matrices is carried out by a comparison of the names and/or path names of the elements in the first communication matrix with the names and/or path names of the elements in the second communication matrix and/or via a comparison of the IDs of the respective elements.

5. The method according to claim 1, wherein the recorded communication data to be transformed are read from a data stream, wherein the steps c)-e) are carried out during the ongoing test of the ECU under test, wherein the data stream is made available to the test system for processing the communication data via a second communication link, and wherein the second communication link is given by a physical or a virtual communication link.

6. The method according to claim 1, wherein the transformation of the communication data, the residual bus simulation and the manipulation of the messages on the test system are carried out via at least one first computing unit and an associated storage unit.

7. The method according to claim 1, wherein at least steps a)-d) ii) are performed prior to the test and the recorded and transformed communication data are stored in the file and read from the file during a test of the ECU under test.

8. The method according to claim 1, wherein in step (c) the user data of messages is obtained from the communication data and signals in the user data are compared with the specifications for signals by the elements of the second communication matrix.

9. The method according to claim 5, wherein the test system has a gateway with a configurable filter function and wherein messages sent to the test system via the second communication link and not assignable to any element of the second communication matrix are filtered via the gateway.

10. The method according to claim 1, wherein values in the communication data are transformed and/or manipulated in the test system before being passed on to the ECU under test via the first communication link.

11. The method according to claim 1, wherein the second communication matrix is given by a second version of the first communication matrix.

12. The method according to claim 1, wherein at least part of the first program for transforming the communication data is generated in an optimized form by a second program for generating program code based on the comparison of the communication matrices and user input.

13. A test system comprising: one or more computing units and one or more associated storage units; a gateway having a configurable filter function; a first communication link and a residual bus simulation unit; wherein the test system is configured to transform recorded communication data via a first program, the communication data being provided by messages from a network or bus communication, the recorded communication being carried out on a basis of a first communication matrix, the recorded communication data being provided to be sent via the test system to an electronic control unit (ECU) under test, the test system being connected via the first communication link to the ECU under test that is configured based on a second communication matrix, the test system further configured to:

a) read the first communication matrix and the second communication matrix;

b) compare elements of the first communication matrix and the second communication matrix by:

i) assign identical or corresponding elements; and ii) categorize changes in the elements of the second communication matrix as compared to the elements of the first communication matrix;

c) determine the data to be transformed, wherein the data to be transformed are given by those communication data that are adapted to be assigned to an element of the first communication matrix that corresponds to an element of the second communication matrix, wherein the element of the second communication matrix has categorized changes as compared to the corresponding element of the first communication matrix;

d) process the communication data by:

i) transform the data to be transformed according to predefined rules to the categorized changes;

ii) discard the recorded communication data, which can be assigned to an element of the first communication matrix for which no identical or corresponding element exists in the second communication matrix; and e) send the recorded data that is not to be discarded or transformed and send the data that has been transformed to the ECU under test or save the data to be sent in a file.

14. The method according to claim 5, wherein the recorded communication data to be transformed are read from the data stream one after the other.

15. An apparatus for transforming recorded communication data via a first program, the communication data being provided by messages from a network or bus communication, the recorded communication being carried out on a basis of a first communication matrix, the recorded communication data being provided to be sent via a test system to an electronic control unit (ECU) under test, the test system being connected via a first communication link to the ECU under test that is configured based on a second communication matrix, comprising:

a) means for reading the first communication matrix and the second communication matrix;

b) means for comparing elements of the first communication matrix and the second communication matrix by:

i) assigning identical or corresponding elements; and ii) categorizing changes in the elements of the second communication matrix as compared to the elements of the first communication matrix;

c) means for determining the data to be transformed, wherein the data to be transformed are given by those communication data that are adapted to be assigned to an element of the first communication matrix that corresponds to an element of the second communication matrix, wherein the element of the second communication matrix has categorized changes as compared to the corresponding element of the first communication matrix;

d) means for processing the communication data by:

i) transforming data to be transformed according to predefined rules to the categorized changes;

ii) discarding the recorded communication data, which can be assigned to an element of the first communication matrix for which no identical or corresponding element exists in the second communication matrix; and e) means for sending the recorded data that is not to be discarded or transformed and sending the data that has been transformed to the ECU under test or saving the data to be sent in a file.

* * * * *